Figure 1:
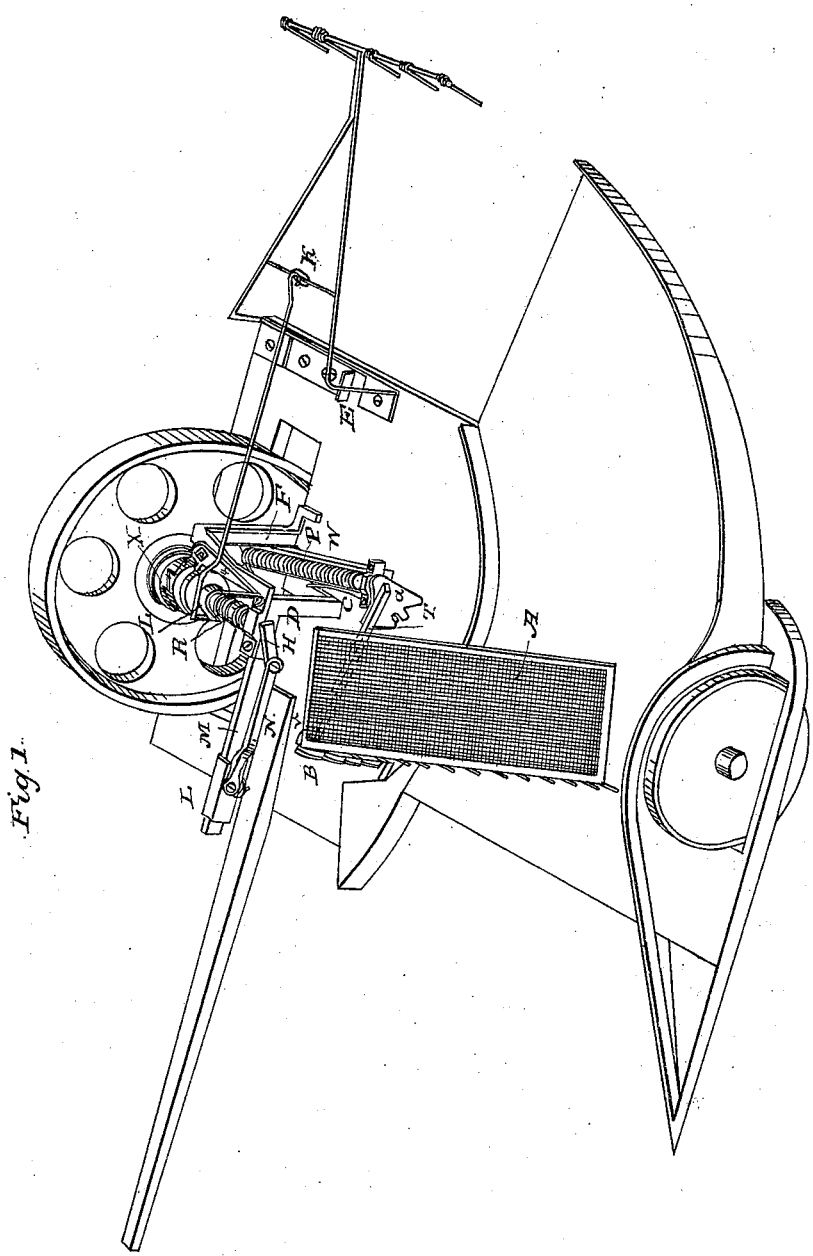

C. R. BRINCKERHOFF.

Harvester Rake.

No. 24,093.

2 Sheets—Sheet 1.

Patented May 24, 1859.

WITNESSES

INVENTOR

C. R. BRINCKERHOFF.
Harvester Rake.
No. 24,093.
2 Sheets—Sheet 2.
Patented May 24, 1859.
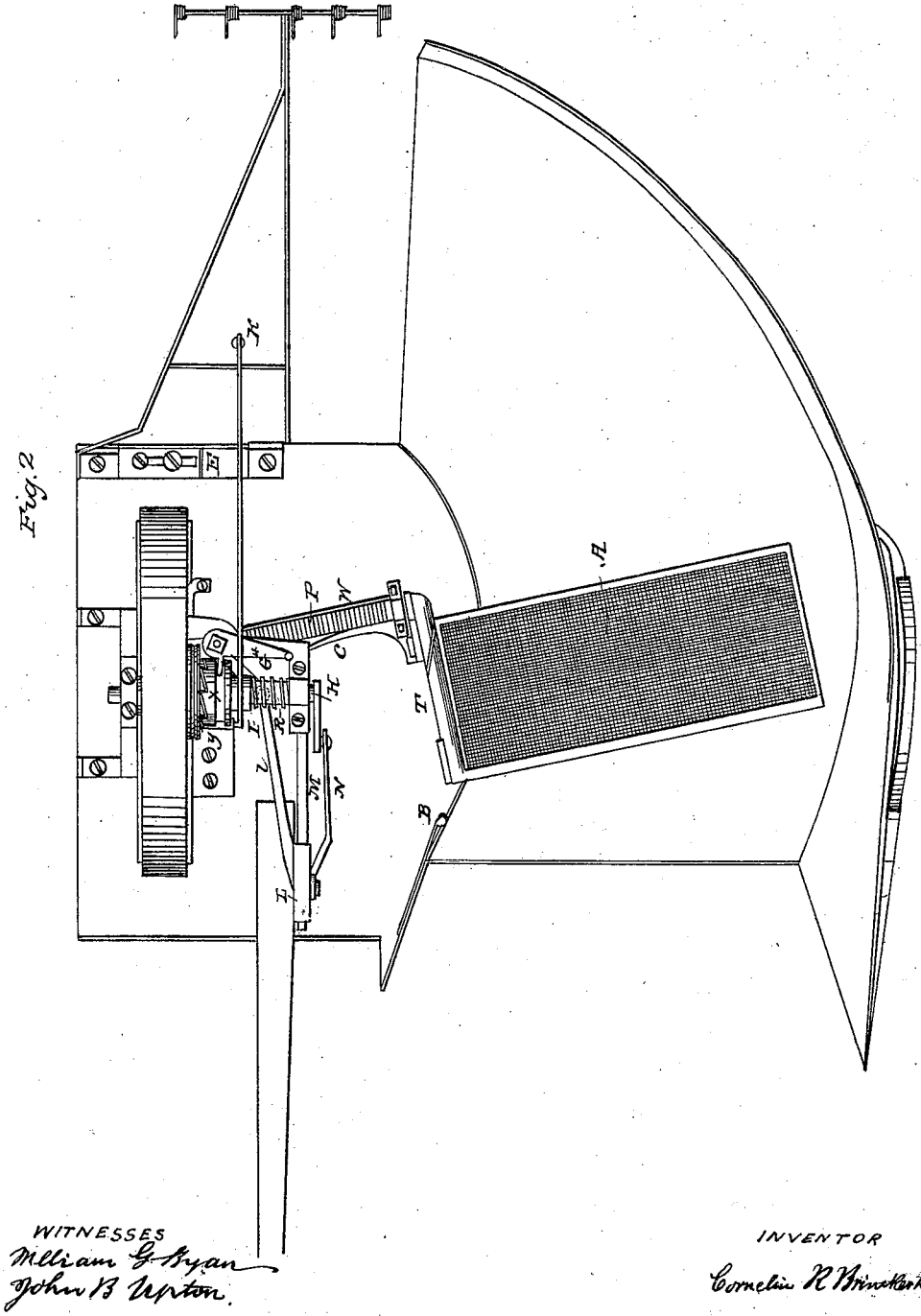

UNITED STATES PATENT OFFICE.

CORNELIUS R. BRINCKERHOFF, OF BATAVIA, NEW YORK.

IMPROVEMENT IN HARVESTING-MACHINES.

Specification forming part of Letters Patent No. 24,093, dated May 24, 1859.

*To all whom it may concern:*

Be it known that I, CORNELIUS R. BRINCKERHOFF, of the town of Batavia, in the county of Genesee and State of New York, have invented a new Self-Raker and a Self-Gleaner and Contractor of the Gavels for Harvesting-Machines; and I do hereby declare that the following is a full and exact description thereof, reference being had to the accompanying drawing, with the letters of reference marked thereon.

The nature of my invention consists in the peculiar construction and application of a self-raker which shall discharge the grain from the platform in gavels, and a self rear raker which shall glean the stubble between the gavels and contract the gavels into sheaf form in the manner hereinafter described.

To enable others skilled in the arts to make and use my invention, I will proceed to describe its construction and operation.

I make the platform, in the usual form, on a quarter-circle, so that the gavels will be delivered at the side by the rake, and will be out of the way of the team and machine on the succeeding round.

The rake-head is made of iron, with a shank (marked T) about two and a half feet long, and then is carried nearly at right angles, represented by shaft with a coil of wire thereon, (marked P,) and is connected to the sweep-post marked F by a socket-joint. It is all in one piece in the form of a crank. The arm or shank running back from the rake-head, instead of being arranged so as to be nearly horizontal when the rake is dropped upon the platform, may be carried up at an angle of about forty-five degrees. Thus arranged it forms a support for one side of the open-work divider marked A. I then bend said shank down at about the same angle of forty-five degrees and carry it down sufficiently far that being bent again it may be carried horizontal to a sweep-post standing perpendicular and having a gyratory motion. This horizontal part of the shank is about two feet long, and is attached to said post and plays in a socket, and is supported by sweep extending from said post, and having on the outer end thereof a box in which said horizontal part of said shank is supported. The said sweep-post is placed in the rear of the main shaft, and in such a position as to secure a motion to the rake which shall conform to the location of the cutter-bar. It has a gyratory motion, which is communicated to it by the "eighth arm," as I designate it, which is connected with a crank upon the end of the shaft. In some machines it may be so connected directly without any intervening arm or arms. I call it an "eighth arm," because it should be located on the sweep-post at an eighth, or nearly so, distance from the point where the rake-shank plays in a socket on said sweep-post, so that the rake shall have a quarter-circle motion backward and forward, or it may be set to make more or less than a quarter-circle. I connect this eighth arm with another arm or pitman by a hinge which is hinged to a gib or sleeve on a slide extending forward from the post that supports the end of the crank-shaft, and I also connect the crank that is fastened to the end of said crank-shaft by a pitman or arm hinged thereto, and also hinged to said gib or sleeve, and as said crank is turned by the revolution of the shaft with the driving-wheel said gib or sleeve moves backward and forward on said slide or guide and the connections—viz., said arm marked N and said arm marked O, gives the proper motion to the eighth arm, marked G, which causes the sweep-post to gyrate and operate the rake backward and forward. Said sweep-post is designated in the drawing by letter F. The horizontal part of said rake-shank which plays in a socket in said sweep-post is marked P, and has coiled thereon a strong wire spring, which gives force to the rake in its descent and holds it to its work in moving the grain from the platform. This is effected by fastening one end of said wire or spring to the sweep-post and the other end to the rake-shank. The slide or guide upon which the said gib or sleeve moves is marked M, and the gib or sleeve is marked L. The sweep extending from said sweep-post, and which supports the rake-shank, is marked W, and upon the front side thereof I attach a catch connected with a spring in any ordinary form. The catch is marked C, and not shown in the drawing. By means of this catch, operated by the spring, the rake is held up as it passes from the rear to the front of the platform in a horizontal position as regards the open divider, and when it has reached the proper point the catch is detached by the spring striking against the pillow-block post marked D, or any suitably-arranged contrivance for this purpose, and the rake is thrown upon the cut grain.

In order to prevent any rebound of the rake and hold it more firmly to its work until the gavel is fairly started on the platform, I have constructed a rack, marked B, with teeth or catches thereon, and placed it with a spring in such a place near the inner corner or end of the rake-head that when the rake has descended it will be arrested and held by one of those notches until the rake has moved backward a short distance. This rack is marked B. On that part of the rake-shank marked T a piece of iron may be fastened to catch into the rack-teeth and hold the rake down, and is marked V. The shank marked T extends from the inner corner of the rake-head to the horizontal shank of the rake.

In order to divide the falling grain from that which is being removed by the rake, I attach to the head of the rake and that part of the shank thereof marked T, at about an angle of forty-five degrees, an open divider made of wire-gauze or any similar material. I use an open divider on account of its lightness, durability, and strength. It is much better than a tight roof. The open divider will permit the wind to pass through, which is quite important at times, and will not retain water, like a tight one. It is marked A in the drawing.

I have arranged a ratchet-clutch upon the main shaft, (marked X,) and by means of the lever marked 4 operating in a groove the rake for removing the grain from the platform, and also the rear gleaning-rake, may be thrown out of gear, and the same effect is performed by the backing of the machine.

I make a casting, marked a, and attach the same to the horizontal part of the rake-shank, at the outer end thereof at the angle. It is slipped on said part and made fast. It forms nearly a quarter of a circle, and is made fast at the outside of the box in which said rake-shank rests. In the circular part a notch is made, and a projection inward on the lower side of the notch. This casting is represented in the drawing by a. As soon as the rake has delivered its gavel the lower part of this casting strikes a projection or piece of iron on the platform marked E, and the rake is thrown up until the catch C is thrown into the notch in said casting, which must invariably be done on account of the projection on the lower side of said notch, which will always prevent its slipping by and capsizing the rake.

I construct my rear raker or gleaner and contractor of the gavel so as to have the same in sheaf form, ready for binding, by attaching the same to the rear part of the frame of the machine by a hinge. It may be attached to the platform. I make it with spring-teeth, so that they cannot be held or injured by stones or other ordinary obstructions, and connect it by two arms or shanks to the frame of the machine, which I crook or bend upward in order to pass over the grain. On these two shanks I have a cross-piece, and attach a single arm thereto by a loose link, K, about six inches long, which arm is carried forward over the main shaft and down perpendicularly, or nearly so, and attached to a hinge, marked Y, attached to the platform or any ordinary device on the frame.

I construct a cam on the ratchet-casting marked X, which is attached to the main shaft, and by means of this cam the movement of the rear rake is so adjusted that it will rake the stubble between the gavels, and will contract the gavels into a sheaf form for binding, and then will pass over them.

The eighth arm, marked G, instead of being attached to the sweep-post, may be attached to the horizontal shank of the rake, which plays in a socket in said sweep-post, or to the casting or sweep marked W, which supports said shank at such a point to produce the same result.

Having thus fully described my invention and mode of construction, what I claim as my invention, and desire to secure by Letters Patent, is the following:

1. The combination of the crank, operated by the main shaft, with the rake and sweep-post to which it is attached, and the eighth arm, when arranged in the manner described.

2. The open-work divider to divide the grain falling upon the platform from the gavel being removed therefrom by the rake when arranged upon the rake-head in the manner and for the purpose specified.

3. The spring-catch marked C and dog marked a in combination, and the location of said catch to break the forward motion of the rake and aid its return by the spring, arranged substantially as described.

4. The projection on the lower side of the slot or notch in the dog to arrest the catch with certainty, in the manner described.

5. The application and arrangement of the toothed rack connected with the spring, by which the rake is caught and held after its descent upon the gavel, the rebound thereof is prevented, and the gavel removed with greater certainty.

6. The placing of a rake having spring-teeth in the rear of the machine for the purpose of gleaning and contracting the gavel into sheaf form, substantially as described.

7. The combination of the cam attached to the main shaft with the arm of the rear rake to cause it to pass over the gavels at the proper time.

8. The ratchet, cam I, and lever, in combination, substantially as described, for throwing both rakes into or out of action, as set forth.

CORNELIUS R. BRINCKERHOFF.

Witnesses:
AMBROSE STEVENS,
M. W. HEWITT.